US012012101B2

United States Patent
Mohammed et al.

(10) Patent No.: US 12,012,101 B2
(45) Date of Patent: Jun. 18, 2024

(54) METHODS AND SYSTEMS FOR ENHANCED THERMAL BRAKING FOR ELECTRIC VEHICLE APPLICATIONS

(71) Applicant: GM GLOBAL TECHNOLOGY OPERATIONS LLC, Detroit, MI (US)

(72) Inventors: Abbas Mohammed, Whitby (CA); Matthew Stephen Zebiak, Ann Arbor, MI (US); Fahim Javid, Pickering (CA); Dhruv Patel, Oshawa (CA); Steven Aiuto, Commerce Township, MI (US); Ralph David Schlottke, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 241 days.

(21) Appl. No.: 17/807,400

(22) Filed: Jun. 17, 2022

(65) Prior Publication Data

US 2023/0406312 A1 Dec. 21, 2023

(51) Int. Cl.
| | | |
|---|---|---|
| *B60W 30/18* | (2012.01) |
| *B60L 7/10* | (2006.01) |
| *B60L 58/26* | (2019.01) |
| *B60L 58/27* | (2019.01) |
| *B60W 10/192* | (2012.01) |
| *B60W 10/30* | (2006.01) |

(52) U.S. Cl.
CPC ......... *B60W 30/18127* (2013.01); *B60L 7/10* (2013.01); *B60L 58/26* (2019.02); *B60L 58/27* (2019.02); *B60W 10/192* (2013.01); *B60W 10/30* (2013.01); *B60W 2510/244* (2013.01); *B60W 2510/246* (2013.01); *B60W 2710/18* (2013.01); *B60W 2710/246* (2013.01); *B60W 2710/30* (2013.01)

(58) Field of Classification Search
CPC ......... B60W 30/18127; B60W 10/192; B60W 10/30; B60W 2510/244; B60W 2510/246; B60W 2710/18; B60W 2710/246; B60W 2710/30; B60L 58/27; B60L 58/26; B60L 7/10
See application file for complete search history.

(56) References Cited

U.S. PATENT DOCUMENTS

| 10,392,018 | B1 * | 8/2019 | Rhodes | .................... B60L 58/25 |
| 2017/0072813 | A1 * | 3/2017 | Martin | ..................... B60L 53/00 |

(Continued)

FOREIGN PATENT DOCUMENTS

| DE | 102018128695 A1 | 5/2020 |
| DE | 102020128547 A1 | 5/2021 |
| EP | 3892508 A1 | 10/2021 |

*Primary Examiner* — Hussein Elchanti
(74) *Attorney, Agent, or Firm* — Lorenz & Kopf, LLP (57) ABSTRACT

Methods and systems are provided for controlling thermal conditioning of a battery system associated with brakes of a vehicle towing a trailer. In one embodiment, a method includes: determining, by a processor, that a temperature of the battery system is outside of a defined temperature range; determining, by the processor, a delta value between a brake request and a battery charge limit; generating, by the processor, a control signal to at least one of a heater and a compressor of the vehicle based on the delta value; generating, by the processor, a control signal to the battery system to initiate regeneration braking; and generating, by the processor, a braking reduction request to reduce braking by the trailer.

20 Claims, 4 Drawing Sheets

(56) References Cited

U.S. PATENT DOCUMENTS

| | | | |
|---|---|---|---|
| 2019/0217847 A1* | 7/2019 | Hawley | B60W 30/18109 |
| 2020/0247252 A1* | 8/2020 | Dudar | H01M 10/615 |
| 2021/0171015 A1* | 6/2021 | Artail | B60K 6/445 |
| 2022/0169085 A1* | 6/2022 | Marmara | B60R 16/033 |
| 2023/0095519 A1* | 3/2023 | Hoshi | B60L 7/26 |
| | | | 701/22 |
| 2023/0116610 A1* | 4/2023 | Woo | B60L 58/12 |
| | | | 701/22 |
| 2023/0166601 A1* | 6/2023 | Schneider | B60T 1/10 |
| | | | 701/70 |
| 2023/0219545 A1* | 7/2023 | Pietila | B60T 8/172 |
| | | | 701/93 |
| 2023/0311657 A1* | 10/2023 | Landry | B60K 35/213 |
| | | | 320/134 |

* cited by examiner

METHODS AND SYSTEMS FOR ENHANCED THERMAL BRAKING FOR ELECTRIC VEHICLE APPLICATIONS

INTRODUCTION

The technical field generally relates to electric vehicles and, more specifically, to methods and systems for regenerative braking in an electric vehicle.

Regenerative braking uses an electric traction motor to recover energy generated by the vehicle's momentum during braking that would otherwise be lost, for example as heat generated by friction brakes. Regenerative braking is commonly used to reach range and efficiency targets in electric vehicles. Under certain conditions such as extreme cold or hot battery temperatures, the battery packs associated with the electric traction motor are not able to accept much energy. This limits the vehicle's regenerative braking capabilities. In such scenarios, the friction brakes are used to provide the remainder of the required brake force, losing opportunity to harvest energy from a braking event.

Accordingly, it is desirable to provide methods and systems for improving braking methods and system of an electric vehicle. Furthermore, other desirable features and characteristics of the present disclosure will become apparent from the subsequent detailed description and the appended claims, taken in conjunction with the accompanying drawings and this background.

SUMMARY

In accordance with an exemplary embodiments, methods and systems are provided for controlling thermal conditioning of a battery system associated with brakes of a vehicle towing a trailer. In one embodiment, a method includes: determining, by a processor, that a temperature of the battery system is outside of a defined temperature range; determining, by the processor, a delta value between a brake request and a battery charge limit; generating, by the processor, a control signal to at least one of a heater and a compressor of the vehicle based on the delta value; generating, by the processor, a control signal to the battery system to initiate regeneration braking; and generating, by the processor, a braking reduction request to reduce braking by the trailer.

In various embodiments, the brake request includes a vehicle brake request and a trailer brake request.

In various embodiments, the determining that the temperature is outside of the defined temperature range comprises determining that the temperature is below a first threshold, and wherein the generating the control signal comprises generating the control signal to the heater to increase the temperature of the battery system.

In various embodiments, the determining that the temperature is outside of the defined temperature range comprises determining that the temperature is above a second threshold, and wherein the generating the control signal comprises generating the control signal to the compressor to decrease the temperature of the battery system.

In various embodiments, the method further includes evaluating enable conditions, and in response to the enable conditions being met, performing the determining that a temperature of the battery system is outside of the defined temperature range, the determining the delta value between the brake request and the battery charge limit, the generating the control signal to the at least one of the heater and the compressor of the vehicle based on the delta value, and the generating the control signal to the battery system.

In various embodiments, the enable conditions include diagnostic values associated with at least one of the battery system, a drive unit system, the heater, the compressor, and the trailer.

In various embodiments, the enable condition includes an anti-lock brake system status, and an electronic stability control status.

In various embodiments, the method further includes: determining, by the processor, that a battery charge limit is less than a third threshold; determining, by the processor, that brake fade is occurring; determining, by the processor, a second delta value based on a driver brake request and an actual braking torque; generating, by the processor, a second control signal to the at least one of the heater and the compressor of the vehicle based on the second delta value; and generating, by the processor, a second control signal to the battery system for regeneration braking.

In various embodiments, the method includes evaluating enable conditions, and in response to the enable conditions being met, performing the determining that a battery charge limit is less than the third threshold, the determining that brake fade is occurring; the determining the second delta value based on the driver brake request and the actual braking torque, and the generating the second control signal.

In various embodiments, the enable conditions include diagnostic values associated with at least one of the battery system, a drive unit system, the heater, the compressor, and the trailer.

In various embodiments, the enable conditions include an anti-lock brake system status, and an electronic stability control status.

In another embodiment, a system includes: a computer readable medium configured to store a plurality of threshold values associated with the battery system of the vehicle; and a processor onboard the vehicle. The processor is configured to: determine that a temperature of the battery system is outside of a defined temperature range, wherein the range is based on the plurality of thresholds; determine a delta value between a brake request and a battery charge limit; generate a control signal to at least one of a heater and a compressor of the vehicle based on the delta value; generate a control signal to the battery system for regeneration braking; and generate a braking reduction request to reduce braking by the trailer.

In various embodiments, the brake request includes a vehicle brake request and a trailer brake request.

In various embodiments, the processor determines that the temperature is outside of the defined temperature range by determining that the temperature is below a first threshold of the plurality of thresholds, and wherein the processor generates the control signal by generating the control signal to the heater to increase the temperature of the battery system.

In various embodiments, the processor determines that the temperature is outside of the defined temperature range by determining that the temperature is above a second threshold of the plurality of thresholds, and wherein the processor generates the control signal by generating the control signal to the compressor to decrease the temperature of the battery system.

In various embodiments, the processor is further configured to evaluate enable conditions, and in response to the enable conditions being met, performing the determining that a temperature of the battery system is outside of the defined temperature range, the determining the delta value between the brake request and the battery charge limit, the generating the control signal to the at least one of the heater and the compressor of the vehicle based on the delta value, and the generating the control signal to the battery system.

In various embodiments, the enable conditions include diagnostic values associated with at least one of the battery system, a drive unit system, the heater, the compressor, and the trailer, a hitch articulation angle, an anti-lock brake system status, and an electronic stability control status.

In various embodiments, the processor is further configured to: determine that a battery charge limit is less than a third threshold; determine that brake fade is occurring; determine a second delta value based on a driver brake request and an actual braking torque; determine a second control signal to the at least one of the heater and the compressor of the vehicle based on the second delta value; and determine a second control signal to the battery system for regeneration braking.

In various embodiments, the processor is further configured to evaluate enable conditions, and in response to the enable conditions being met, perform the determining that a battery charge limit is less than the third threshold, the determining that brake fade is occurring; the determining the second delta value based on the driver brake request and the actual braking torque, and the generating the second control signal.

In various embodiments, the enable conditions include diagnostic values associated with at least one of the battery system, a drive unit system, the heater, the compressor, and the trailer, an anti-lock brake system status, and an electronic stability control status.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
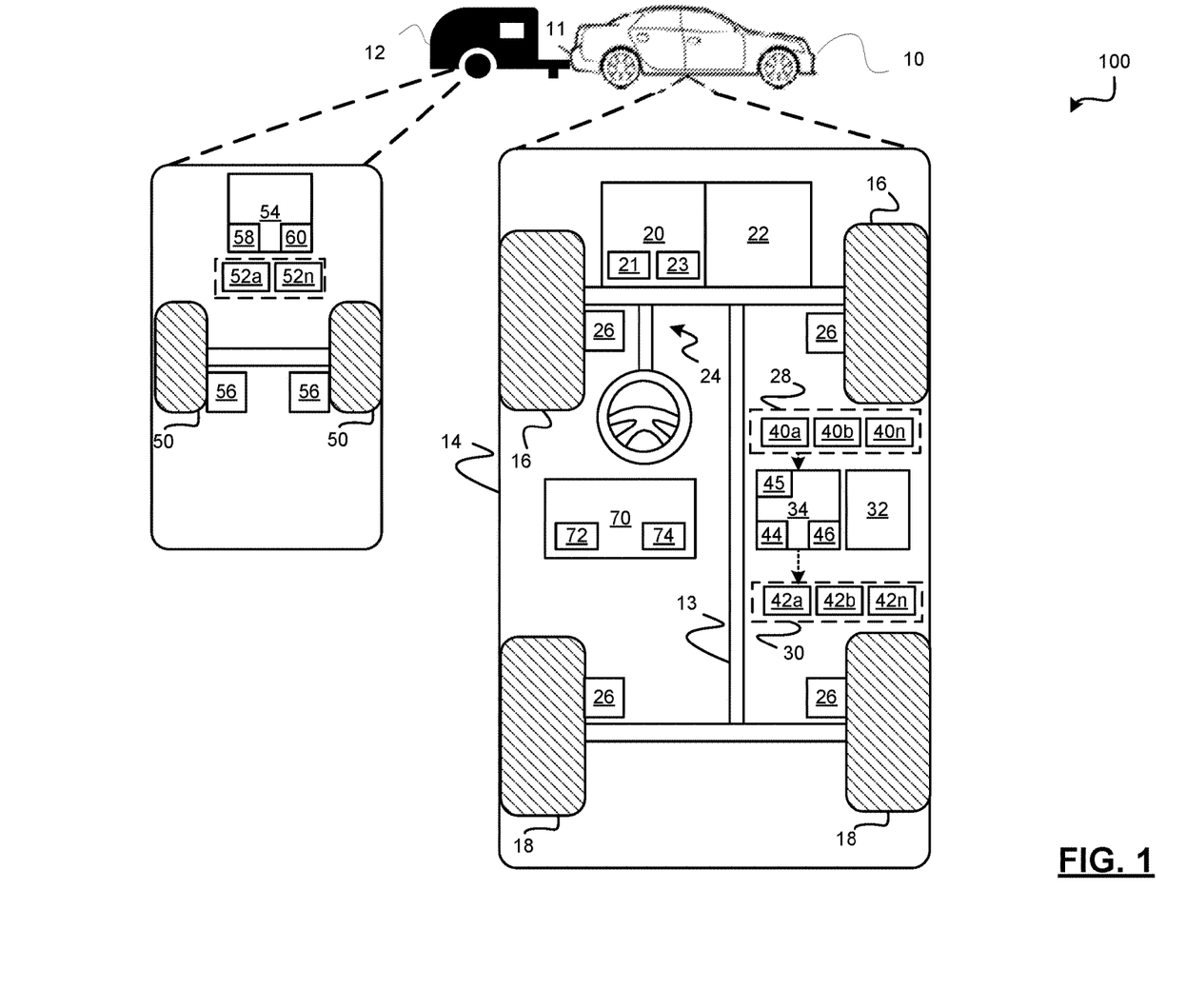
FIG. 1 is a functional block diagram of a vehicle that includes a braking system of a vehicle that is towing a trailer, in accordance with various embodiments.

With reference to FIG. 1, a braking system shown generally at 100 is associated with a vehicle 10 and a trailer 12 in accordance with various embodiments. The vehicle 10 is configured to couple to and connect to the trailer 12 via a connection apparatus 11 and is configured to tow the trailer 12. In various embodiments, the connection apparatus 11 comprises a hitch. In various other embodiments, the connection apparatus 11 comprises one or more other types of systems, such as a gooseneck for a fifth wheel trailer, and so on. In various embodiments, the connection apparatus 11 further comprises a wiring harness configured to communicate power and/or communication signals to components of the trailer 12.

In various embodiments, the vehicle 10 comprises an automobile. The vehicle 10 may be any one of a number of several types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In various embodiments, the vehicle 10 may also comprise other types of mobile platforms capable of towing and is not limited to an automobile.

As depicted in FIG. 1, the exemplary vehicle 10 is an electric vehicle and generally includes a chassis 13, a body 14, front wheels 16, and rear wheels 18. The body 14 is arranged on the chassis 13 and substantially encloses components of the vehicle 10. The body 14 and the chassis 13 may jointly form a frame. The wheels 16-18 are each rotationally coupled to the chassis 13 near a respective corner of the body 14.

The electric vehicle 10 generally includes a propulsion system 20, a transmission system 22, a steering system 24, a brake system 26, a sensor system 28, an actuator system 30, at least one data storage device 32, and at least one controller 34. The propulsion system 20 includes an electric machine such as an electric traction motor or a combination of an electric machine and an internal combustion engine that is powered by a battery system 21 that includes one or more batteries and a drive unit 23.

In various embodiments, the transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission.

In various embodiments, the brake system 26 is configured to provide braking torque to the vehicle wheels 16-18. The brake system 26 includes a regenerative braking system that supplies energy to the battery system 21 or other battery system of the vehicle 10. In various embodiments, the brake system 26 may further include friction brakes, brake by wire, and/or other appropriate braking systems. The steering system 24 influences a position of the vehicle wheels 16-18. While depicted as including a steering wheel for illustrative purposes, in some embodiments contemplated within the scope of the present disclosure, the steering system 24 may not include a steering wheel.

In various embodiments, the vehicle 10 includes a heating and cooling system 70 that includes a heater 72 and a compressor 74 for heating and cooling components of the vehicle 10 such as, but not limited to the propulsion system 20 including the battery system 21, the transmission system 22, and/or the interior cabin of the vehicle 10.

The sensor system 28 includes one or more sensing devices 40a-40n that sense observable conditions of the exterior and/or interior environment of the vehicle 10 and/or of the vehicle 10 itself. The sensing devices 40a-40n can include, but are not limited to, radars, lidars, global positioning systems, optical cameras, thermal cameras, ultrasonic sensors, inertial measurement units, pressure sensors, position sensors, speed sensors, and/or other sensors.

The actuator system 30 includes one or more actuator devices 42a-42n that control one or more vehicle features such as, but not limited to, the propulsion system 20, the transmission system 22, the steering system 24, the brake system 26, and the heating and cooling system 70. In various embodiments, the vehicle features can further include interior and/or exterior vehicle features such as, but are not limited to, doors, a trunk, and cabin features such as music, lighting, etc. (not numbered).

As depicted in FIG. 1, in various embodiments, the trailer 12 also includes a plurality of wheels 50, as well as one or more sensors 52a-52n, a controller 54, and/or a braking system 56 associated with the wheels 50. In various embodiments, the sensors 52a-52n of the trailer 12 provide sensor data pertaining to the trailer 12. Also in various embodiments, the controller 54 of the trailer 12 may include a processor 58 and computer readable storage device or media 60 that provide certain functions described in connection with the controller 34 of the vehicle 10. In addition, in various embodiments, the braking system 56 may include regenerative brakes, friction brakes, brake by wire, and/or other appropriate braking systems and are configured to provide braking for the trailer 12, for example in accordance with instructions provided by the controller 34 of the vehicle 10 (and/or, in certain embodiments, via the controller 54 of the trailer 12).

With reference back to the vehicle 10, the data storage device 32 stores data for use in controlling the vehicle 10. In various embodiments, the data storage device 32 stores defined threshold values for controlling the vehicle components as disclosed herein. As can be appreciated, the data storage device 32 may be part of the controller 34, separate from the controller 34, or part of the controller 34 and part of a separate system.

The controller 34 includes at least one processor 44, a communication bus 45, a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10. The bus 45 serves to transmit programs, data, status and other information or signals between the various components of the vehicle and/or trailer. The bus 45 can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the braking system 100 and, when executed by the processor 44, perform thermal conditioning methods as disclosed herein. In general, the processor 44 is configured to identify when the vehicle 10 is towing the trailer 12 and determine that the battery system 21 has a regeneration limit of less than a total braking request (e.g., from the vehicle brakes and the trailer brakes). In response, the processor is configured to determine that the battery requires thermal conditioning. The processor 44 is configured to allow for the difference between the regeneration limit and the total braking request to be filled by controlling additional braking from the regenerative braking system. The energy from this additional braking will be used to heat or cool the battery system 21 (and optionally the cabin of the vehicle 10) through the heating and cooling system 70 as needed. In order to maintain overall braking performance (e.g., prevent over-braking), the processor 44 is configured to reduce brake output from the trailer brake system 56. The processor 44 also controls supplemental braking when friction brakes experience brake fade by selectively heating/cooling the battery system 21. As can be appreciated, the methods improve regenerative braking and thus overall electric range of the electric vehicle 10.

It will be appreciated that the controller 34 may otherwise differ from the embodiment depicted in FIG. 1. For example, the controller 34 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 34 may also otherwise differ from the embodiment depicted in FIG. 1, for example in that the computer system of the controller 34 may be coupled to or may otherwise utilize one or more remote computer systems and/or other control systems.

Figure 2:
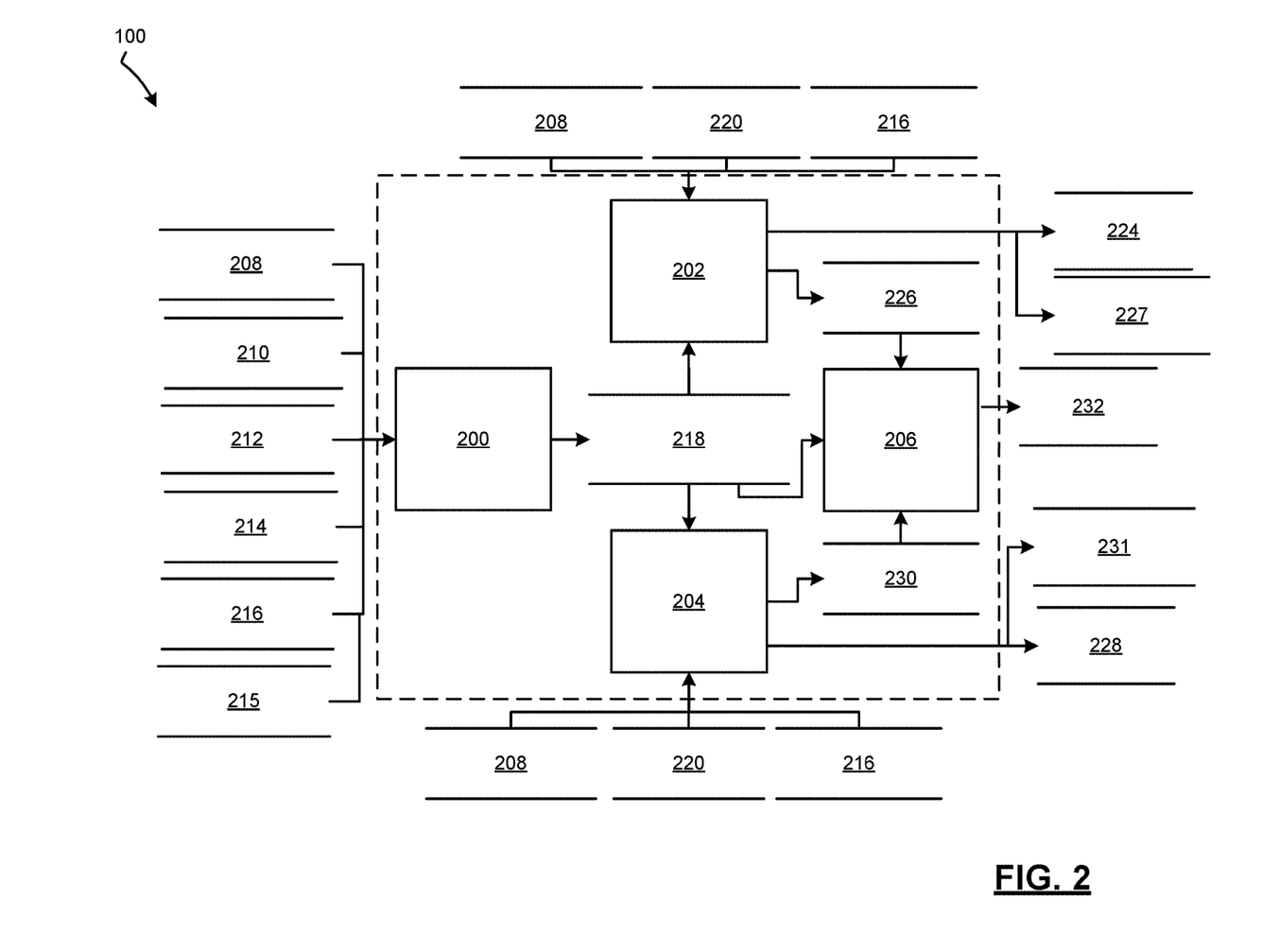
FIG. 2 is a dataflow diagram illustrating the braking system of the vehicle of FIG. 1, in accordance with various embodiments.

With reference to FIG. 2 and with continued reference to FIG. 1, a dataflow diagram illustrates elements of the braking system 100 of FIG. 1 in accordance with various embodiments. As can be appreciated, various embodiments of the braking system 100 according to the present disclosure may include any number of modules embedded within the controller 34 which may be combined and/or further partitioned to similarly implement systems and methods described herein. Furthermore, inputs to the braking system 100 may be received from the sensor system 28, received from other control modules (not shown) associated with the vehicle 10, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like. In various embodiments, the braking system 100 includes an enablement module 200, a heater control module 202, a compressor control module 204, and a drive unit control module 206.

In various embodiments, the enablement module 200 receives as input battery temperature data 208, trailer tow data 210, hitch articulation data 212, diagnostic data 214 for system components such as, but not limited to the heater 72, the compressor 74, the drive unit 23, the trailer 12, and the brake system 26, 56, and battery charge limit data 216, and system active data 215. The enablement module 200 evaluates the input data to determine whether to enable a thermal braking action. For example, when the battery temperature is below a low threshold (e.g., five degrees Celsius) of a range and the vehicle 10 is towing the trailer 12 with a hitch articulation angle of less than a threshold (e.g., five degrees), the anti-lock braking system is not active, the electronic stability control is not active, and no diagnostic faults are found, the enablement module 200 sets enablement data 218 to indicate enable heater control.

In another example, when the battery temperature is above a high threshold (e.g., forty-five degrees Celsius) of the range and the vehicle 10 is towing the trailer 12 with a hitch articulation angle of less than a threshold (e.g., five degrees), the anti-lock braking system is not active, the electronic stability control is not active, and no diagnostic faults are found, the enablement module 200 sets the enablement data 218 to indicate enable compressor control.

In still another example, when the battery charge limit is less than a low threshold, and the vehicle 10 is towing the trailer 12 with a hitch articulation angle of less than a threshold (e.g., five degrees) but greater than zero degrees, the anti-lock braking system is not active, the electronic stability control is not active, and no diagnostic faults are found, the enablement module 200 sets the enablement data 218 to indicate enable maximum load.

In various embodiments, the heater control module 202 receives as input the enablement data 218, the battery temperature data 208, brake request data 220, and battery change limit data 222. When the enablement data 218 indicates to enable heater control, the heater control module 202 determines control signals for controlling the heater 72. For example, the heater control module 202 determines when the brake request is greater than the battery charge limit and computes a delta as the brake request of the vehicle 10 and the trailer 12 minus the battery charge limit, and a thermal power request signal 224 is generated to the heater 72 based on the delta to reduce the trailer brake output by engaging the heater for battery heating. The heater control module 202 generates an additional dynamic power request data 226 to the drive unit control module 206 to initiate regeneration and braking by the vehicle 10 by allowing for use of the energy for heating and/or cooling. The heater control module 202 generates a braking reduction request 227 based on the delta to reduce the commanded braking by the trailer brakes.

When the enable data indicates to enable maximum load, and a brake fade is active, the heater control module 202 dynamically computes a thermal power request signal 224 based on maximum heater capabilities. For example, the heater control module 202 computes a delta as the driver braking request minus the actual braking torque. The heater control module 202 generates the thermal power request signal 224 to the heater 72 based on the delta to maximize the heater use and to reduce brake fade and/or improve brake performance. As can be appreciated, in various embodiments, both the compressor 74 and the heater 72 can be utilized to reduce brake fade. In such embodiments, the thermal power request signal 224 of the heater 72 is determined based on the thermal power request of the compressor 74. The heater control module 202 generates an additional dynamic power request data 226 to the drive unit control module to initiate regeneration and braking by the vehicle 10 by allowing for use of the energy for heating and/or cooling.

In various embodiments, the compressor control module 204 receives as input the enablement data 218, the battery temperature data 208, the brake request data 220, and battery charge limit data 216. When the enablement data 218 indicates to enable compressor control, the compressor control module 204 determines control signals for controlling the compressor 74. For example, the compressor control module 204 determines when the brake request is greater than the battery charge limit and computes a delta as the brake request of the vehicle 10 and the trailer 12 minus the battery charge limit, and a thermal power request signal 228 is generated to the compressor 74 based on the delta to reduce the trailer brake output by engaging the compressor 74 for cooling of the battery system 21. The compressor control module 204 generates an additional dynamic power request data 230 to the drive unit control module 206 to initiate regeneration by allowing for use of the energy for heating and/or cooling. The compressor control module 204 generates a braking reduction 231 request based on the delta to reduce the commanded braking by the trailer brakes.

When the enablement data 218 indicates to enable maximum load, and a brake fade is active, the compressor control module 204 dynamically computes a thermal power request signal 228 based on maximum compressor capabilities. For example, the compressor control module 204 computes a delta as the driver braking request minus the actual braking torque. The compressor control module 204 generates the thermal power request signal 228 to the compressor 74 based on the delta to maximize the compressor 74 and to reduce brake fade and/or improve brake performance. As can be appreciated, in various embodiments, both the compressor 74 and the heater 72 can be utilized to reduce brake fade. In such embodiments, the thermal power request signal 228 of the compressor 74 is determined based on the thermal power request of the heater 72. The compressor control module 204 generates an additional dynamic power request data 230 to the drive unit control module 206 to initiate regeneration and braking by the vehicle 10 by allowing for use of the energy for heating and/or cooling.

In various embodiments, the drive unit control module 206 receives as input the enablement data 218, and the dynamic power request data 226, 230 from the heater control module 202 and the compressor control module 204. When the enablement data 218 indicates that thermal braking (heater and/or compressor) is enabled, and dynamic power request data 226, 230 is received, the drive unit control module 206 generates additional dynamic power request signal 232 to the drive unit 23 to initiate regeneration and braking by the vehicle 10 for use of the energy for heating and/or cooling.

Figure 3:
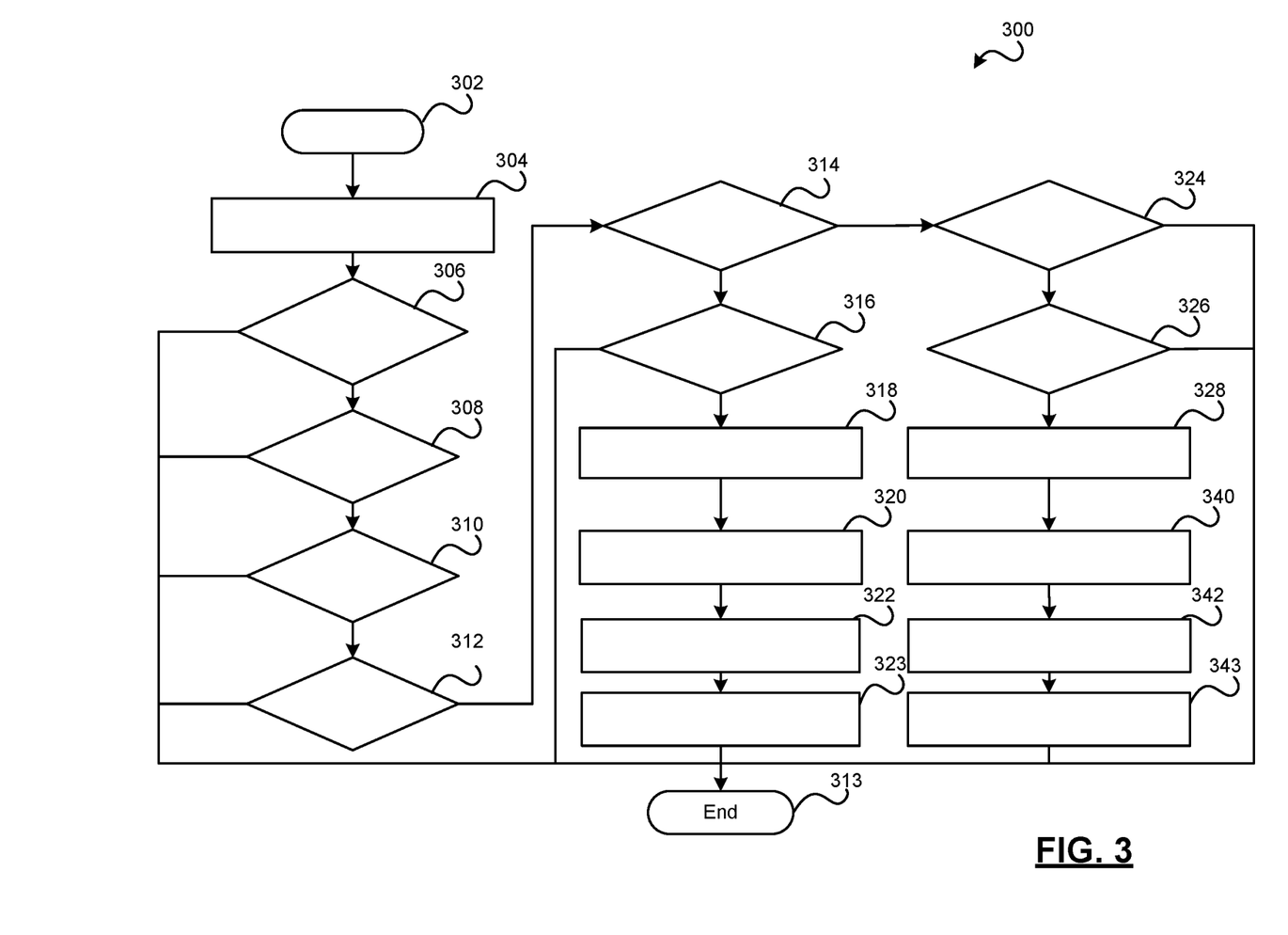
FIGS. 3 and 4 are flowcharts of a processes for controlling braking of a vehicle towing a trailer, in accordance with various embodiments.
Figure 4:
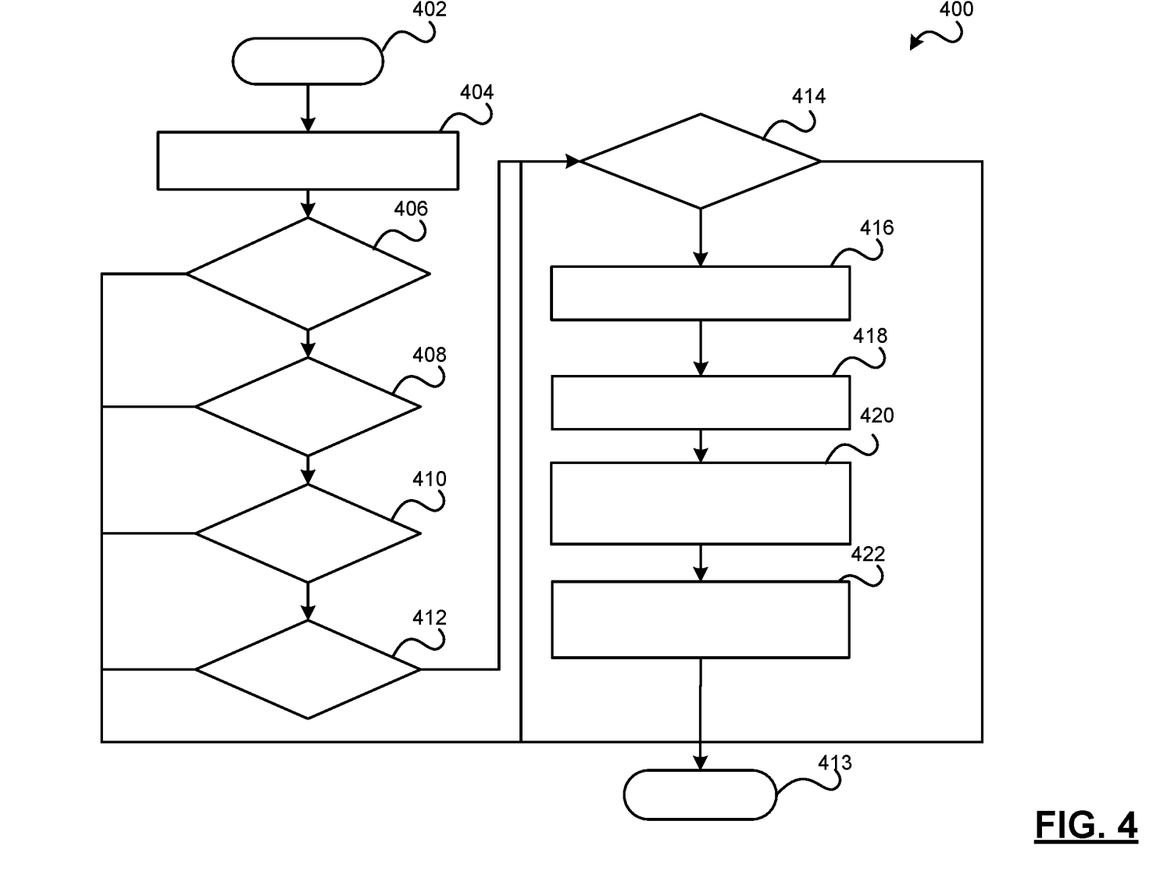

With reference to FIGS. 3 and 4 and with continued reference to FIGS. 1-2, flowcharts are provided of methods 300, 400 for thermal conditioning within the vehicle 10 of FIG. 1 as performed by the braking system 100, in accordance with exemplary embodiments. As can be appreciated in light of the disclosure, the order of operation within the method is not limited to the sequential execution as illustrated in FIGS. 3 and 4, but may be performed in one or more varying orders as applicable and in accordance with the present disclosure. In various embodiments, the methods 300, 400 can be scheduled to run based on one or more predetermined events, and/or can run continuously during operation of the vehicle 10.

In various embodiments, the method 300 is uses thermal conditioning to allow for additional regeneration by directing energy into high voltage systems such as the heater 72 and the compressor 74.

In one example, the method 300 may begin at 302. The enable conditions data is received at 304 and evaluated at 306-312. For example, the battery temperature is compared to a range (e.g., between five degrees and forty-five degrees Celsius) at 306, and it is determined whether the vehicle 10 is towing the trailer 12 at 308, and the articulation angle of the hitch 11 and the active systems are evaluated at 310. When the battery temperature is outside of the range at 306 and the vehicle 10 is towing the trailer 12 at 308 with a hitch articulation angle of less than a threshold (e.g., five degrees), the anti-lock braking system not active, and the electronic stability control non-active at 310, proper function of the system components is evaluated at 312. Otherwise, the method 300 may end at 313.

At 312, diagnostics values are evaluated for the heater 72, the compressor 74, the drive unit 23, the trailer 12, and the brake system 26, 56. When no diagnostic fault values are found at 312, the thermal conditioning is enabled. When fault values are found at 312, the method 300 may end at 313.

Once the system is enabled, and the battery temperature is below the low threshold of the range (e.g., five degrees Celsius) at 314, the thermal conditioning using the heater 72 is enabled at 316-322. For example, if the brake request is greater than the battery charge limit at 316, the delta is computed as the brake request of the vehicle 10 and the trailer 12 minus the battery charge limit at 318, and the thermal power request is generated to the heater 72 based on the delta at 320 to engage the heater 72 for battery system heating. The additional dynamic power request is sent to the drive unit 23 to allow for regeneration braking at 322. The trailer braking reduction request is generated to reduce the trailer brake output at 323. Thereafter, the method 300 may end at 313.

Once the system is enabled, and the battery temperature is above the high threshold of the range (e.g., forty-five degrees Celsius) at 324, thermal conditioning using the compressor 74 is enabled at 324-342. For example, if the brake request is greater than the battery charge limit at 326, the delta is computed as the brake request of the vehicle 10 and the trailer 12 minus the battery charge limit at 328, and the thermal power request is generated to the compressor 74 based on the delta at 340 to engage the compressor 74 for battery cooling. The additional dynamic power request is sent to the drive unit to allow for additional regeneration braking at 342. The trailer braking reduction request is generated to reduce the trailer brake output at 343. Thereafter, the method 300 may end at 313.

In various embodiments, the method 400 uses thermal conditioning to reduce the trailer braking power load by using the trailer's kinetic energy to condition the battery system 21.

In one example, the method 400 may begin at 402. The enable conditions data is received at 404 and evaluated at 406-412. For example, the battery charge limit is compared to a threshold at 406, it is determined whether the vehicle 10 is towing the trailer 12 at 408, and the active systems are evaluated at 410. When the battery charge limit is below the threshold at 406 and the vehicle 10 is towing the trailer 12 at 408, the anti-lock braking system not active, and the electronic stability control non-active at 410, proper function of the system components is evaluated at 412. Otherwise, the method 400 may end at 413.

At 412, diagnostics values are evaluated for the heater 72, the compressor 74, the drive unit 23, the trailer 12, and the brake system 26, 56. When no diagnostic fault values are found at 412, the thermal conditioning is enabled. When fault values are found at 412, the method 400 may end at 413.

Once the system is enabled, and brake fade is active at 414, the thermal power request is computed at 416 as the heater power plus the compressor power, a delta is computed at 418 as the driver braking request minus the actual braking torque. The thermal power request is generated to maximize the compressor 74 and/or the heater 72 based on the delta to reduce brake fade and/or improve brake performance at 420. The additional dynamic power request is sent to the drive unit 23 to allow for additional regeneration braking at 422. Thereafter, the method 400 may end at 413.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling thermal conditioning of a battery system associated with brakes of a vehicle towing a trailer, comprising:
   determining, by a processor, that a temperature of the battery system is outside of a defined temperature range;
   determining, by the processor, a delta value between a brake request and a battery charge limit;
   generating, by the processor, a control signal to at least one of a heater and a compressor of the vehicle based on the delta value;
   generating, by the processor, a control signal to the battery system to initiate regeneration braking; and
   generating, by the processor, a braking reduction request to reduce braking by the trailer.

2. The method of claim 1, wherein the braking reduction request includes a vehicle brake request and a trailer brake request.

3. The method of claim 1, wherein the determining that the temperature is outside of the defined temperature range comprises determining that the temperature is below a first threshold, and wherein the generating the control signal comprises generating the control signal to the heater to increase the temperature of the battery system.

4. The method of claim 1, wherein the determining that the temperature is outside of the defined temperature range comprises determining that the temperature is above a second threshold, and wherein the generating the control signal comprises generating the control signal to the compressor to decrease the temperature of the battery system.

5. The method of claim 1, comprising evaluating enable conditions, and in response to the enable conditions being met, performing the determining that the temperature of the battery system is outside of the defined temperature range, the determining the delta value between the brake request and the battery charge limit, the generating the control signal to the at least one of the heater and the compressor of the vehicle based on the delta value, and the generating the control signal to the battery system.

6. The method of claim 5, wherein the enable conditions include diagnostic values associated with at least one of the battery system, a drive unit system, the heater, the compressor, and the trailer.

7. The method of claim 5, wherein the enable condition includes a hitch articulation angle, an anti-lock brake system status, and an electronic stability control status.

8. The method of claim 1, further comprising:
   determining, by the processor, that a battery charge limit is less than a third threshold;
   determining, by the processor, that brake fade is occurring;
   determining, by the processor, a second delta value based on a driver brake request and an actual braking torque;
   generating, by the processor, a second control signal to the at least one of the heater and the compressor of the vehicle based on the second delta value; and
   generating, by the processor, a second control signal to the battery system for the regeneration braking.

9. The method of claim 8, further comprising evaluating enable conditions, and in response to the enable conditions being met, performing the determining that the battery charge limit is less than the third threshold, the determining that the brake fade is occurring; the determining the second delta value based on the driver brake request and the actual braking torque, and the generating the second control signal.

10. The method of claim 9, wherein the enable conditions include diagnostic values associated with at least one of the battery system, a drive unit system, the heater, the compressor, and the trailer.

11. The method of claim 9, wherein the enable conditions include an anti-lock brake system status, and an electronic stability control status.

12. A system for controlling thermal conditioning of a battery system associated with brakes of a vehicle towing a trailer, comprising:
   a computer readable medium configured to store a plurality of threshold values associated with the battery system of the vehicle; and
   a processor onboard the vehicle and configured to:
      determine that a temperature of the battery system is outside of a defined temperature range, wherein the defined temperature range is based on the plurality of threshold values;
      determine a delta value between a brake request and a battery charge limit;
      generate a control signal to at least one of a heater and a compressor of the vehicle based on the delta value;
      generate a control signal to the battery system for regeneration braking; and
      generate a braking reduction request to reduce braking by the trailer.

13. The system of claim 12, wherein the braking reduction request includes a vehicle brake request and a trailer brake request.

14. The system of claim 12, wherein the processor is further configured to determine that the temperature is outside of the defined temperature range by determining that the temperature is below a first threshold value of the plurality of threshold values, and wherein the processor generates the control signal by generating the control signal to the heater to increase the temperature of the battery system.

15. The system of claim 12, wherein the processor is further configured to determine that the temperature is outside of the defined temperature range by determining that the temperature is above a second threshold value of the plurality of threshold values, and wherein the processor is further configured to generate the control signal by generating the control signal to the compressor to decrease the temperature of the battery system.

16. The system of claim 12, wherein the processor is further configured to evaluate enable conditions, and in response to the enable conditions being met, performing the determining that the temperature of the battery system is outside of the defined temperature range, the determining the delta value between the brake request and the battery charge limit, the generating the control signal to the at least one of the heater and the compressor of the vehicle based on the delta value, and the generating the control signal to the battery system.

17. The system of claim 16, wherein the enable conditions include diagnostic values associated with at least one of the battery system, a drive unit system, the heater, the compressor, and the trailer, a hitch articulation angle, an anti-lock brake system status, and an electronic stability control status.

18. The system of claim 12, wherein the processor is further configured to:
    determine that a battery charge limit is less than a third threshold value;
    determine that brake fade is occurring;
    determine a second delta value based on a driver brake request and an actual braking torque;
    determine a second control signal to the at least one of the heater and the compressor of the vehicle based on the second delta value; and
    determine a second control signal to the battery system for regeneration braking.

19. The system of claim 18, wherein the processor is further configured to evaluate enable conditions, and in response to the enable conditions being met, perform the determining that the battery charge limit is less than the third threshold value, the determining that the brake fade is occurring; the determining the second delta value based on the driver brake request and the actual braking torque, and the generating the second control signal.

20. The system of claim 19, wherein the enable conditions include diagnostic values associated with at least one of the battery system, a drive unit system, the heater, the compressor, and the trailer, an anti-lock brake system status, and an electronic stability control status.

* * * * *